United States Patent [19]
Dambmann et al.

[11] Patent Number: 5,866,357
[45] Date of Patent: *Feb. 2, 1999

[54] METHOD FOR HYDROLYZING PROTEINS WITH GLU/ASP SPECIFIC PROTEASE

[75] Inventors: Claus Dambmann, Soeborg; Steen Bennike Mortensen, Bagsvaerd; Peter Budtz, Frederiksberg; Svend Eriksen, Alleroed, all of Denmark

[73] Assignee: Novo Nordisk A/S, Bagsvaerd, Denmark

[ * ] Notice: The term of this patent shall not extend beyond the expiration date of Pat. No. 5,523,237.

[21] Appl. No.: 927,661

[22] PCT Filed: Mar. 8, 1991

[86] PCT No.: PCT/DK91/00069

§ 371 Date: Aug. 31, 1992

§ 102(e) Date: Aug. 31, 1992

[87] PCT Pub. No.: WO91/13554

PCT Pub. Date: Sep. 19, 1991

[30] Foreign Application Priority Data

Mar. 9, 1990 [DK] Denmark ................... 633/90
Feb. 6, 1991 [DK] Denmark ................... 199/91

[51] Int. Cl.$^6$ ............. C12P 21/06; A61K 38/00
[52] U.S. Cl. ........................ 435/68.1; 530/300
[58] Field of Search ............. 435/68.1; 530/300

[56] References Cited

U.S. PATENT DOCUMENTS

| | | | |
|---|---|---|---|
| 4,100,024 | 7/1978 | Adler-Nissen | 435/68.1 |
| 4,107,334 | 8/1978 | Jolly | 426/7 |
| 4,266,031 | 5/1981 | Tang et al. | 435/188 |
| 5,523,237 | 6/1996 | Budtz et al. | 435/68.1 |

FOREIGN PATENT DOCUMENTS

| | | |
|---|---|---|
| 0 325 986 | 8/1989 | European Pat. Off. |
| 0 355 399 | 2/1990 | European Pat. Off. |
| 0 384 303 | 8/1990 | European Pat. Off. |
| 0482879 | 4/1992 | European Pat. Off. |
| 9005462 | 5/1990 | WIPO . |
| 9213964 | 8/1992 | WIPO . |

OTHER PUBLICATIONS

Drapeau et al. (1972) "Purification and Properties of an Extracellular Protease of *Staphyloccus aureus*", *J. Biol. Chem.*, 247(20), 6720–6726.

Houmard et al. (1972) "Staphylococcal Protease: A Proteolytic Enzyme Specific for Glutamoyl Bonds", *Proc. Nat. Acad. Sci., USA*, 69(12), 3506–3509.

Beaudet et al. (1974) "Structural Heterogeneity of the Protease Isolated from Several Strains of *Staphylococcus aureus*", *J. Bil. Chem.*, 249(30), 6468–6471.

Rydén et al. (1974) "Isolation and Properties of a Staphylococcal Protease, Preferentially Cleaving Glutamoyl–Peptide Bonds", *Eur J. Biochem.*, 44, 105–114.

Houmard (1976) "Preparation of Chromophoric Substrates for the Glutamoyl Specific Staphylococcal Protease", *Int. J. Peptide Protein Res.*, 8, 199–204.

Mosolova et al. (1987) "Glu, Asp–Specific Proteinase from Actinomycetes", *Biokhimiya*, 52(3), 414–422.

Khaldarova et al. (1989) "A Glu. Asp–Specific Proteinase from *Streptomyces thermovulgaris*", *Biokhimiya*, 54(1), 32–38.

Kreier et al. (1983) "Subtilisin–Like Proteinase SSPB", *Biokhimiya*, 48(8), 1365–1373.

Belyaeva et al. (1980) "Comparative Study of Proteolytic Activity of Staphylococci and Identification of Specific Protease", *Prikl. Biokhim. Mikrobiol.*, 16(6), 841–847.

Houmard et al. (1972) *Proc. Nat. Acad. Sci. USA*, 69(12), 3506–3509.

Mosolova et al. (1987) *Biokhimiia*, 52(3), 414–422.

Yoshida et al. (1988) *J. Biochem.*, 104, 451–456.

Niidome et al. (1990) *J. Biochem.*, 108, 965–970.

Svendsen et al. (1992) *Eur. J. Biochem.*, 204, 165–171.

Kakudo et al. (1992) *J. Biol. Chem.*, 267(33), 23782–23788.

Chobert et al., *J. Agric. Food Chem.*, vol. 36, pp. 220–224 (1988).

Wieser et al., *Z. Lebensm. Unters.–Forsch.*, vol. 160, pp. 383–392 (1976).

Olesen, *Chem. Abs.*, vol. 98, No. 1, p. 335, abstract No. 3693n (1982).

*Primary Examiner*—Jon P. Weber
*Attorney, Agent, or Firm*—Steve T. Zelson, Esq.; Elias J. Lambiris, Esq.

[57] ABSTRACT

A method is disclosed for obtaining limited specific hydrolysis of proteins using a Glu/Asp specific protease to produce peptides with C-terminal Glu or Asp. The protease is obtained from *Bacillus licheniformis*, has a mass of about 23,600, is inhibited by diisopropyl fluoride but not by phenylmethane sulfonylfluoride, and has a pH of maximal activity between 6.5 and 10.0. The proteins are treated with the protease at neutral pH and the reaction terminated by raising the temperature above 70° C. or lowering the pH below 5.0 to obtain the hydrolysate. The process may include a second protease which is specific for Arg/Lys, and produces peptides with C-terminal Arg or Lys.

12 Claims, 5 Drawing Sheets

METHOD FOR HYDROLYZING PROTEINS WITH GLUYASP SPECIFIC PROTEASE

FIELD OF INVENTION

The present invention relates to a method of obtaining limited specific hydrolysis of proteins, a protein hydrolysate obtained by the method, and a food product containing the protein hydrolysate.

BACKGROUND OF THE INVENTION

Enzymatic hydrolysis of proteins by means of proteases is a well-established method of preparing protein hydrolysates which have retained the nutritional value of the original proteins and which may therefore advantageously be used in the diet of certain patients who are unable to ingest or digest sufficient amounts of full-length proteins present in ordinary food, or which may be used to improve the nutritional value of milk substitutes for infants. Protein hydrolysates may furthermore be prepared from sources not traditionally utilized for human nutrition and may, as such, either be used as food products in themselves or as additives to other food products.

The proteases which have hitherto been used for the preparation of protein hydrolysates of this type are proteases with a broad specificity, e.g. *Bacillus licheniformis* alkaline protease. A major problem encountered when using proteases with a broad specificity is an often pronounced bitter taste of the protein hydrolysates produced. The bitter taste is the result of cleavage of the proteins at amino acids with hydrophobic side chains, resulting in the formation of peptides with exposed hydrophobic amino acid residues. In full-length proteins and longer peptides, the hydrophobic side chains are inaccessible due to the tertiary structure of the protein molecule in which the side chains are embedded within the folded protein. When smaller peptides are formed by proteolytic cleavage of the protein molecule, the hydrophobic side chains will become exposed and hence accessible to adjacent hydrophobic and hydrophilic receptors on the taste buds. This phenomenon has been determined to give rise to a bitter taste (cf. H. Wieser and H. -D. Belitz, *Z. Lebensm. Unter.-Forsch.* 159, 1975, pp. 65–72; and H. Wieser and H. -D. Belitz, *Z. Lebensm. Unter.-Forsch.* 160, 1976, pp. 383–392).

It has been suggested to overcome the problem of bitterness of the protein hydrolysate by limiting the degree of hydrolysis of the starting proteins, i.e. by limiting the number of peptide bonds cleaved by the protease, e.g. by monitoring the degree of hydrolysis and terminating the proteolytic reaction when a suitable degree of hydrolysis has been obtained (cf. for instance J. Adler-Nissen, *Enzymic Hydrolysis of Food Proteins*, Applied Science Publishers, London 1986). It has been found that such hydrolysates exhibit a reduced bitterness, at least in conjunction with other constituents of the food product in which they are included.

Another way of controlling the degree of hydrolysis is to employ specific proteases which only cleave the protein molecule at certain amino acid residues. This has been suggested by J. -M. Chobert et al., *J. Agric. Food Chem.* 36, 1988, pp. 220–224, reporting the use of the *Staph. aureus* V8 protease which hydrolyses proteins specifically at glutamic and aspartic acid residues.

SUMMARY OF THE INVENTION

It has surprisingly been found that a *Bacillus licheniformis* protease is specific for glutamic and aspartic acid residues and therefore capable of providing a satisfactory limited hydrolysis of proteins resulting in a protein hydrolysate which, in itself, does not have a bitter taste.

Accordingly, the present invention relates to a method of obtaining limited specific hydrolysis of proteins at Glu and/or Asp bonds, wherein an enzyme preparation comprising a proteolytic enzyme with the following characteristics:
(a) it is a serine protease specific for glutamic acid (Glu) and aspartic acid (Asp) residues;
(b) it has a specific activity of at least 25 cpu (as defined herein) per gram of enzyme protein;
(c) it has an apparent molecular weight of about 23,600;
(d) it is inhibited by diisopropyl phosphofluoridate, but not by phenylmethane sulfonylfluoride;
(e) it exhibits 75% or more of its maximum activity in the pH range of 6.5–10.0;
which enzyme preparation is substantially free from other proteolytic activity, is added to a proteinaceous material followed by incubation at a neutral or weakly alkaline pH until the desired degree of hydrolysis is obtained, after which the incubation is terminated by suitably inactivating the enzyme, resulting in the formation of peptides with a C-terminal glutamic or aspartic acid residue.

The proteolytic enzyme defined above has previously been characterized in U.S. Pat. No. 4,266,031 as a contaminant of subtilisin A produced by *Bacillus licheniformis*. However, there is no indication of the specific proteolytic activity of the enzyme in this US patent, and its utility in the protein hydrolysis method of the invention is therefore not anticipated by the disclosure of the enzyme per se in the patent. According to the invention, it has surprisingly been found that the proteolytic enzyme is a protease which is specific for Glu and Asp residues. This property is important for the present purpose since it provides for limited and specific hydrolysis of proteins at Glu and/or Asp residues. These amino acid residues are hydrophilic, resulting in reduced bitterness of the protein hydrolysate produced which therefore does not have any adverse effect on the taste of the food product in which it is incorporated. The non-bitterness of the protein hydrolysate produced by the present method also permits it to be used as a food product in itself and widens the range of food products in which it may be incorporated to include mild-tasting ones such as milk substitute for infants.

In the present context, the term "degree of hydrolysis" is understood to indicate the number of peptide bonds cleaved by the proteolytic enzyme. The maximum degree of hydrolysis is, of course, cleavage at substantially all Glu and Asp residues in the protein molecules. The degree of hydrolysis may be determined as described in example 2 below, using the trinitrobenzene sulphonic acid assay described by J. Adler-Nissen, *J. Agric. Food Chem.* 27, 1979, p. 1256.

Thus, the proteolytic enzyme used in the present method has a similar specificity to the *Staph. aureus* V8 protease suggested for the limited hydrolysis of proteins by J. -M. Chobert et al., supra. There is, however, some indication that the V8 protease is less active than the proteolytic enzyme employed in the present method, i.e. that it has less affinity for its substrate. In their report of an experiment with the hydrolysis of casein, the authors indicate that a degree of hydrolysis of only 6.7% was obtained after 48 hours of incubation.

DETAILED DISCLOSURE OF THE INVENTION

The proteolytic enzyme employed in the present method may be one producible by a microorganism, in particular a bacterium. Such a bacterium may be a strain of *Bacillus licheniformis*, e.g. a strain known to produce subtilisin A as well as another protease corresponding to the proteolytic enzyme defined above. In this case, the proteolytic enzyme may be prepared by culturing the bacterial strain under conditions conducive to the production of alkaline protease which may then be isolated, after which the protease activities may be separated by methods known per se, e.g. by the process described in the above-mentioned U.S. Pat. No. 4,266,031.

The strain of *Bacillus licheniformis* may also be a mutant strain, such as a mutant in which the gene encoding subtilisin A has been inactivated, for instance by conventional mutagenesis procedures involving the use of a mutagen such as nitrosoguanidine, e.g. substantially by the procedure disclosed in the above-mentioned U.S. Pat. No. 4,266,031 (disclosing the inactivation of the gene encoding the proteolytic enzyme of current interest). Alternatively, the inactivation of the subtilisin A gene may also take place by recombinant DNA techniques, e.g. by inserting one or more nucleotides into the subtilisin A gene so as to disrupt the sequence. This may, for instance, be done by homologous recombination, e.g. as described in F. A. Ferrari et al., *J. Bacteriol.* 154 (3), 1983, pp. 1513–1515. The proteolytic enzyme may also be produced by isolating the DNA sequence from a cDNA or genomic library of microorganism producing the enzyme, e.g. a strain of *Bacillus licheniformis*, inserting the DNA sequence into a suitable expression vector, transforming a suitable host microorganism with the vector, growing the host under conditions which are conducive to the production of the enzyme and recovering the enzyme from the culture. These steps may be carried out by standard procedures, cf. T. Maniatis et al., *Molecular Cloning: A Laboratory Manual*, Cold Spring Harbor, 1982.

Figure 4:
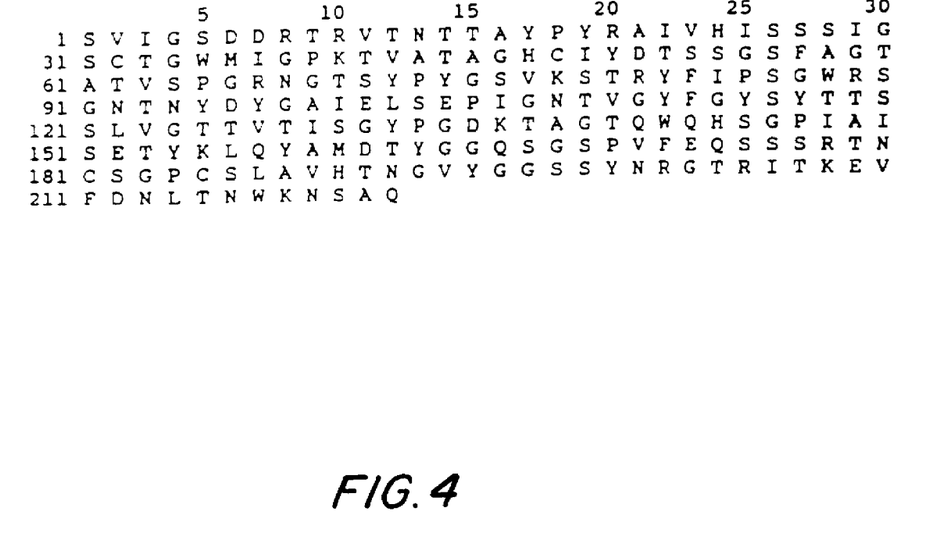

In a particular embodiment of the present process, the proteolytic enzyme is one which has the amino acid sequence shown in the appended FIG. 4, or a derivative thereof.

In the present context, the term "derivative" is understood to indicate a proteolytic enzyme which is derived from the native enzyme by addition of one or more amino acids to either or both the C- and N-terminal end of the native protein, substitution of one or more amino acids at one or a number of different sites in the native amino acid sequence, deletion of one or more amino acids at either or both ends of the native protein or at one or more sites in the amino acid sequence, or insertion of one or more amino acids at one or more sites in the native amino acid sequence, provided that the proteolytic activity of the enzyme is not thereby impaired.

In the course of the hydrolysis reaction, the pH of the incubation mixture, when neutral or slightly alkaline, tends to decrease due to the cleavage of peptide bonds. To monitor the degree of hydrolysis, it is therefore in one specific embodiment preferred to keep the pH constant during incubation of the proteinaceous material with the enzyme preparation. This may be done by titration of the incubation mixture with a base such as NaOH, KOH, Ca(OH)$_2$ or NH$_3$. Monitoring of the pH and titration may advantageously be conducted automatically in a pH-stat.

In another specific embodiment it is preferred to perform the hydrolysis by means of a non-pH-stat method, i.e. the pH is not kept constant during the incubation of the proteinaceous material with the enzyme preparation. In this embodiment the degree of hydrolysis can easily be followed by measuring the increase in osmolality during the hydrolysis.

The proteinaceous material which may advantageously be hydrolysed by the present method may be any one of the proteins or proteinaceous materials suggested for hydrolysis in the prior literature. Examples of suitable proteinaceous materials are animal proteins such as whey protein, casein, meat proteins, fish protein, red blood cells, egg white or gelatin, or vegetable proteins such as soy protein, grain proteins, e.g. wheat gluten or zein, rape seed protein, alfalfa protein, pea protein, fabaceous bean protein, cotton seed protein or sesame seed protein.

To obtain a satisfactory degree of hydrolysis, the proteolytic enzyme may suitably be added to the proteinaceous material in an amount of 0.05–15 cpu/100 g of protein, in particular 0.1–5 cpu/100 g of protein.

In accordance with established practice, the proteolytic enzyme may suitably be inactivated by increasing the temperature of the incubation mixture to above about 70° C., or by decreasing the pH of the incubation mixture to below about 5.0.

For purposes requiring a higher degree of hydrolysis than that obtainable by means of the above-defined proteolytic enzyme alone, i.e. a higher yield of peptides soluble at acid pH values, it has surprisingly been found to be advantageous to add another proteolytic enzyme to the proteinaceous material. This additional proteolytic enzyme should preferably be one which, like the above-defined proteolytic enzyme, is specific for hydrophilic amino acids, in particular hydrophilic amino acids other than Glu or Asp. Examples of suitable additional proteolytic enzymes are trypsin and other trypsin-like proteases. Trypsin is a protease which specifically cleaves peptide bonds at Lys and Arg residues. The term "trypsin-like proteases" is intended to indicate proteases with a similar specificity to that of trypsin. An example of a suitable trypsin-like protease is a protease obtainable from a species of Fusarium (e.g. as disclosed in WO 89/06270).

When the proteinaceous material is hydrolysed with both a first proteolytic enzyme an additional proteolytic enzyme, the respective amounts of enzyme added to the proteinaceous material may suitably be in the range of 0.05–5 cpu/100 g of protein for the first proteolytic enzyme and 0.1–10 cpu/100 g of protein for the additional proteolytic enzyme.

In another aspect, the present invention relates to a protein hydrolysate which consists essentially of peptides with a C-terminal glutamic or aspartic acid residue as a result of specific hydrolysis of proteins at Glu and/or Asp bonds with an enzyme preparation comprising a proteolytic enzyme with the following characteristics:

(a) it is a serine protease specific for glutamic acid (Glu) and aspartic acid (Asp) residues;
(b) it has a specific activity of at least 25 cpu (as defined herein) per gram of enzyme protein;
(c) it has an apparent molecular weight of about 23,600;
(d) it is inhibited by diisopropyl phosphofluoridate, but not by phenylmethane sulfonylfluoride;
(e) it exhibits 75% or more of its maximum activity in the pH range of 6.5–10.0;

which enzyme preparation is substantially free from other proteolytic activity.

Suitable sources of proteins may be any one of the proteinaceous material conventionally used for protein hydrolysis, e.g. to the ones indicated above, or a combination thereof.

In accordance with the invention, it has been found that protein hydrolysates with a relatively high proportion of high molecular weight peptides and a relatively low proportion of low molecular weight peptides are significantly less bitter than hydrolysates containing a high proportion of low molecular weight peptides. The limited specific hydrolysis obtained by using the specific proteolytic enzyme defined above is particularly well suited to provide peptides in this favourable weight range. Thus, the protein hydrolysate of the invention preferably comprises a high proportion of peptides with a molecular weight in the range of 1000–20,000, preferably in the range of 1000–10,000, and a low proportion of peptides with a molecular weight below about 1000.

In a particular embodiment, the present invention relates to a protein hydrolysate which, apart from peptides with a C-terminal glutamic or aspartic acid residue as a result of specific hydrolysis of the protein at Glu and/or Asp bonds, comprises peptides with a C-terminal Lys and/or Arg residue as a result of specific hydrolysis of the proteins at Lys and/or Arg bonds. This protein hydrolysate is particularly well suited for purposes requiring a higher degree of hydrolysis of the hydrolysate, such as when the hydrolysate is intended for inclusion in beverages as protein enrichment. As discussed above, the increase in the degree of hydrolysis may suitably be obtained by hydrolysing a proteinaceous material with another specific protease such as trypsin. In this case, the hydrolysate may suitably comprise a high proportion of peptides with a molecular weight in the range of 1000–10,000 and a low proportion of peptides with a molecular weight below about 1000.

In a further aspect, the present invention relates to a food product comprising a protein hydrolysate of the invention. The protein hydrolysate may either be one prepared by hydrolysis with the Glu/Asp specific protease alone or one prepared by additional hydrolysis with a Lys/Arg specific protease as described above. Food products containing protein hydrolysates are known from the prior literature in which the problem of bitterness caused by the presence of the hydrolysates has also been discussed.

An important food product of the invention is a dietary nutrient intended for infirm patients who are unable to ingest any or all of their nutrient requirements through ordinary food. In such products, the protein hydrolysate of the invention will frequently be the sole proteinaceous component for which reason the non-bitterness of the protein hydrolysate of the present invention is of particular interest for inclusion in products of this type. As dietary nutrient products will often be liquid or semi-liquid, the protein hydrolysate included in them should preferably contain a high concentration of soluble peptides. It is therefore preferred to include a protein hydrolysate prepared by hydrolysing the proteinaceous starting material with both the Glu/Asp specific protease and the Lys/Arg specific protease as described above in order to obtain a higher yield of soluble peptides.

The amount of protein hydrolysate incorporated in the food product will typically be in the range of 1–30% by weight. The dietary food product of the invention may otherwise be formulated substantially as described in U.S. Pat. No. 4,100,024 or EP Patent Specification No. 246 747. Thus, the product may additionally contain suitable sources of fat and/or carbohydrate. Suitable sources of fat may for instance be vegetable oils (e.g. maize or sunflower oil or the like). Suitable sources of carbohydrate may for instance be sugars such as sucrose or lactose, hydrolyzed starch, maltodextrins or the like. The dietary product may further comprise usual additives such as flavouring agents, sweeteners, vitamins, minerals and trace elements.

Another important food product of the present invention is a milk substitute for infants. The milk substitute may be formulated in substantially the same way as that indicated in the prior literature for products of this type (cf. for instance EP 322 589) with the exception that the protein hydrolysate included in the known products is replaced by the protein hydrolysate of the present invention. In products of this type, the non-bitterness of the present protein hydrolysates is a decided advantage as infants take strong exception to milk with a bitter taste. In this case, too, it may be preferred to include a hydrolysate produced by hydrolysing the starting protein with both the Glu/Asp specific protease and a Lys/Arg specific protease. The present protein hydrolysate may advantageously be incorporated in hypoallergenic milk substitutes, the hydrolysate having a significantly lower allergenicity than full-length milk proteins.

The food product of the invention may also include the protein hydrolysate of the invention as a protein supplement or to provide other properties of the food product. Thus, the protein hydrolysate incorporated in the food product may for instance be based on scrap meat (e.g. the so-called mechanically recovered meat, i.e. meat remaining on bones after the regular pieces of meat have been carved from animal carcases in the slaughterhouse; for a more detailed description of the general procedure, see applicant's co-pending patent application No. PCT/DK89/000272) rendered from bone by treating crushed bone with the Glu/Asp specific protease by the method of the present invention. The resulting protein hydrolysate may then suitably be added to mincemeat products, e.g. sausages or patés.

The food product of the invention may also be a babyfood product in which part or all of the protein content is composed of a protein hydrolysate based on vegetable and/or meat proteins. This will serve to make the product more easily digestible by infants.

BRIEF DESCRIPTION OF THE DRAWINGS

Figure 1:
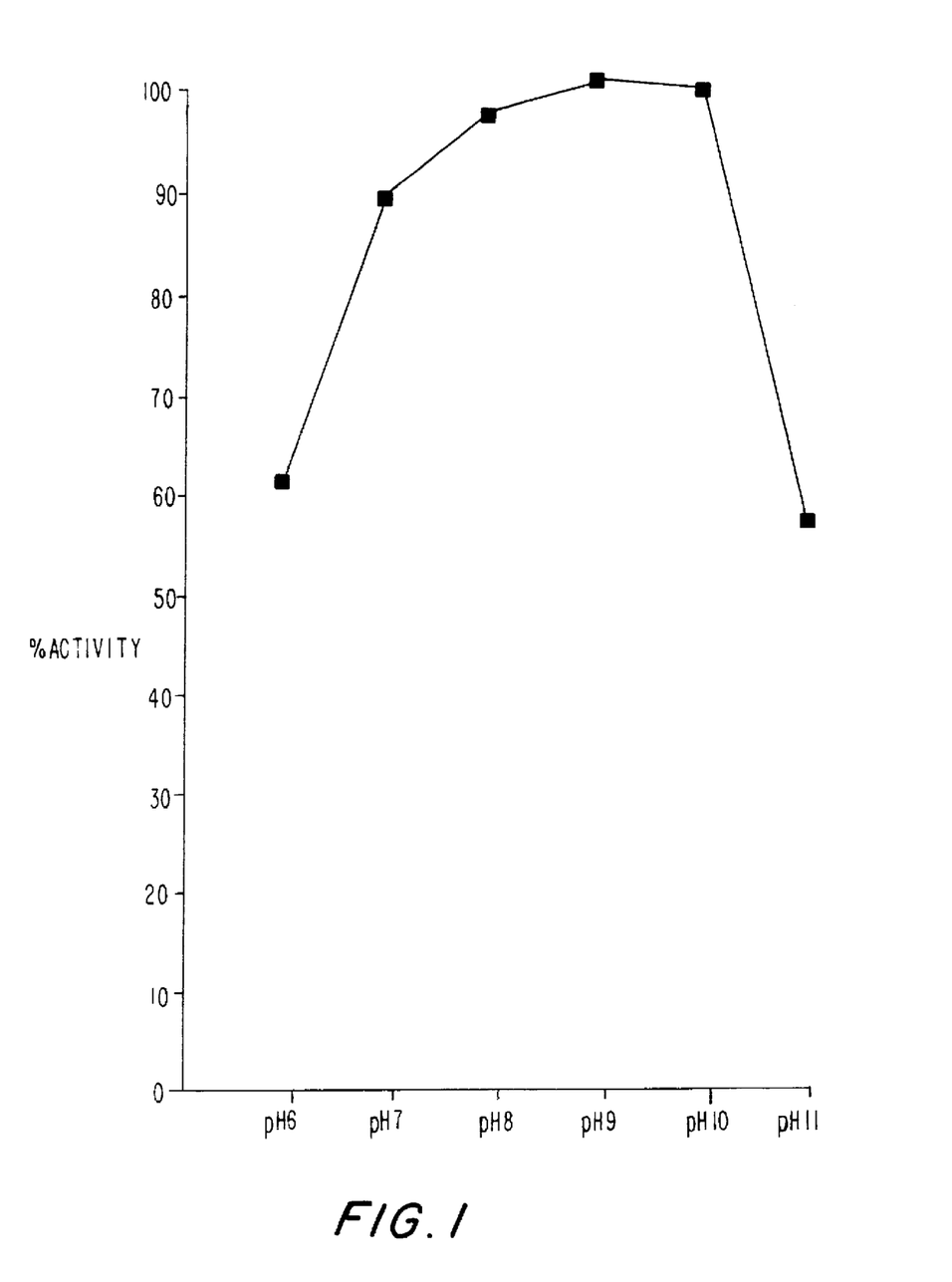
Figure 2:
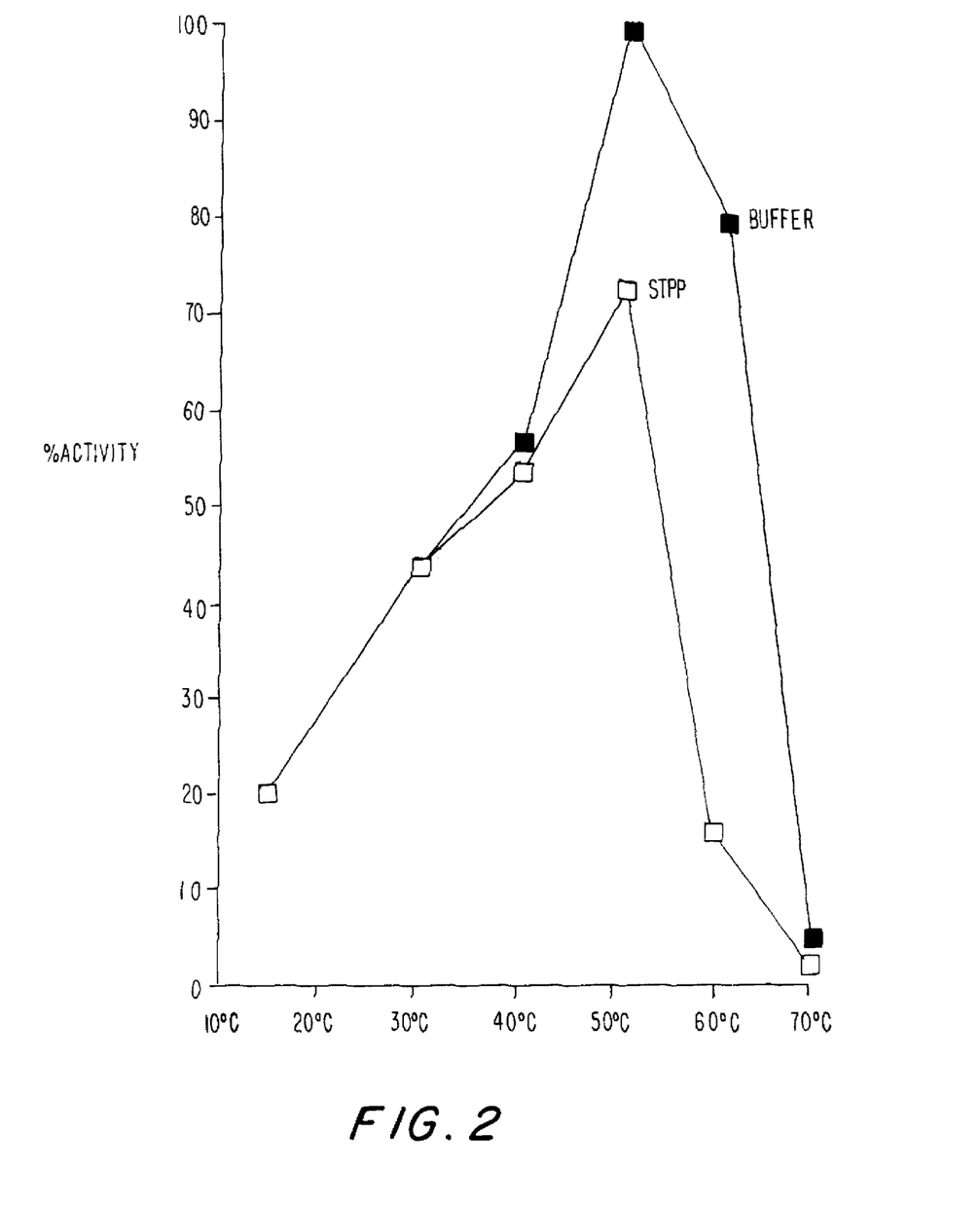
Figure 3:
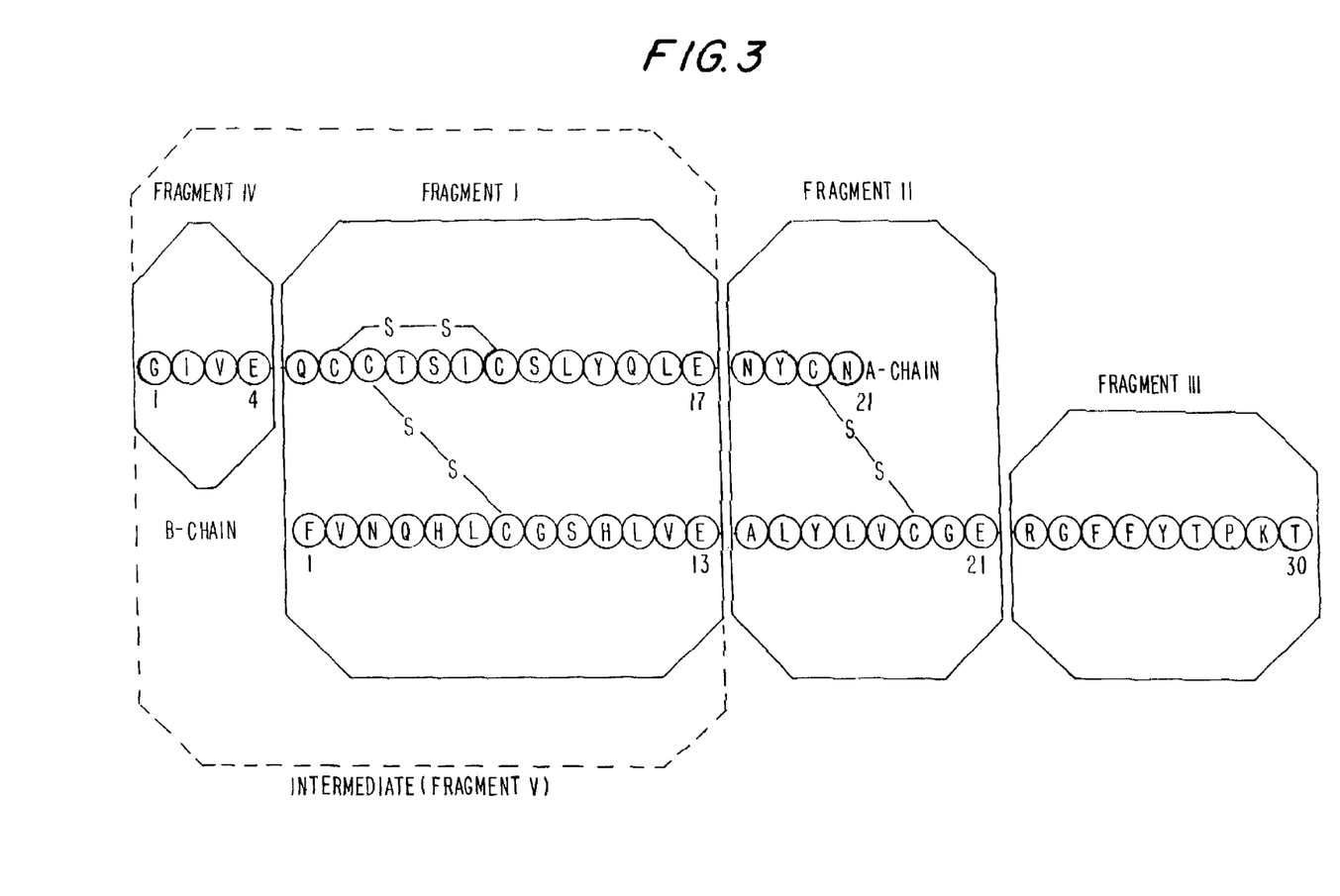
Figure 5:
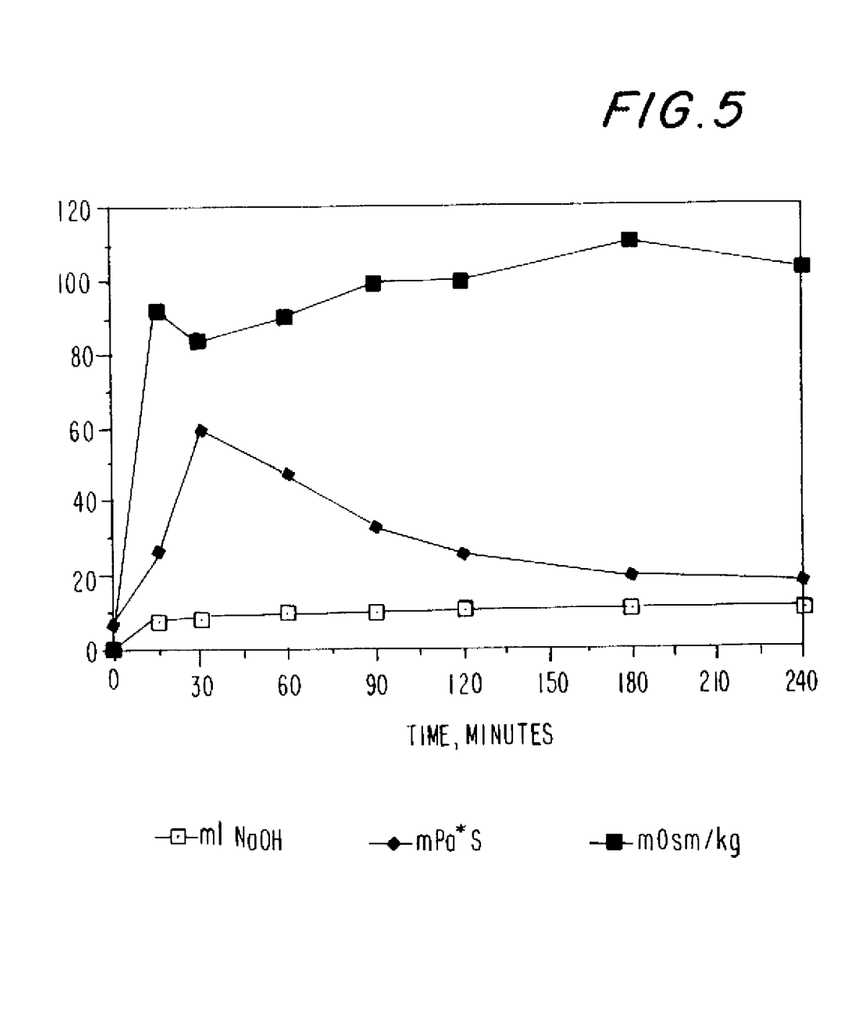

The present invention is further illustrated in the following examples with reference to the appended drawings wherein:

FIG. 1 is a graph showing the pH activity of the SP 446 protease;

FIG. 2 is a graph showing the temperature activity of the SP 446 protease in the presence (white squares) and absence (black squares) of sodium tripolyphosphate (STPP);

FIG. 3 shows the cleavage of insulin by the SP 446 protease;

FIG. 4 (SEQ ID NO: 1) shows the amino acid sequence of the SP 446 protease, in which the amino acids are indicated in the established one-letter code; and FIG. 5 shows the viscosity, osmolality, and base consumption data from SP 446 hydrolysis of whey protein concentrate ⊟=ml NaOH; ◆=mPa*s; ■=Δ mOsm/kg).

The invention is further illustrated in the following examples which are not intended to be in any way limiting to the scope of the invention as claimed.

EXAMPLE 1

Characterization of *Bacillus licheniformis* SP 446 protease
Yield of SP 446 protease Alcalase™ PPA 1618 was purified as described in U.S. Pat. No. 4,266,031. The yield of purified SP 446 protease was determined by measuring the enzymatic activity of the starting and purified SP 446 protease using CBZ—Phe—Leu—Glu—pNA (Boehringer Mannheim) as substrate. It was necessary to add phenylmethane sulfonylfluoride (1:10 vol) in order to inactivate subtilisin A present in the enzyme preparation, as subtilisin A is able to degrade the substrate, apparently by cleaving after Phe or Leu. The enzymatic activity of the starting material (40 ml) was measured in a Perkin-Elmer Lambda reader as the absorbance at 405 nm/min./ml and was determined to be 166,920. The enzymatic activity of the purified material (31 ml) was similarly measured and determined to be 158,720. Thus, the yield of SP 446 protease was 95%.

Proteolytic activity

The proteolytic activity of the SP 446 protease was determined to be 27 cpu/g using casein as substrate. 1 casein protease unit (cpu) is defined as the amount of enzyme liberating 1 millimole of primary amino groups (determined by comparison with a serine standard) per minute under standard conditions as described below:

A 2% (w/v) solution of casein (Hammarsten®, supplied by Merck AG, Darmstadt, FRG) is prepared with the Universal Buffer described by Britton and Robinson, *J. Chem. Soc.*, 1931, p. 1451), adjusted to a pH of 9.5. 2 ml of the substrate solution are pre-incubated in a water bath for 10 min. at 25° C. 1 ml of an enzyme solution containing b g/ml of the enzyme preparation, corresponding to about 0.2–0.3 cpu/ml of the Universal Buffer (pH 9.5) is added. After 30 min. of incubation at 25° C., the reaction is terminated by the addition of a quenching agent (5 ml of a solution containing 17.9 g of trichloroacetic acid, 29.9 g of sodium acetate and 19.8 g of acetic acid made up to 500 ml with deionized water). A blank is prepared in the same way as the test solution with the exception that the quenching agent is added prior to the enzyme solution. The reaction mixtures are kept for 20 min. in a water bath after which they are filtered through Whatman 42 paper filters. A folder AF 228/1 describing this analytical method is available upon request from Novo Nordisk A/S, Denmark.

Primary amino groups are determined by their colour development with o-phthaldialdehyde (OPA), as follows:

7.62 g of disodium tetraborate decahydrate and 2.0 g of sodium dodecylsulfate are dissolved in 150 ml of water. 160 mg of OPA dissolved in 4 ml of methanol were then added together with 400 µl of β-mercaptoethanol after which the solution is made up to 200 ml with water. To 3 ml of the OPA reagent are added 400 µl of the filtrates obtained above, with mixing. The optical density (OD) at 340 nm is measured after about 5 min. The OPA test is also performed with a serine standard containing 10 mg of serine in 100 ml of Universal Buffer (pH 9.5). The buffer alone is used as a blank. The protease activity is calculated from the OD measurements by means of the following formula:

cpu/ml enzyme solution:

$$\frac{(OD_t - OD_b) \times C_{ser} \times Q}{(OD_{ser} - OD_B) \times MW_{ser} \times t_i}$$

cpu/g of enzyme preparation=cpu/ml: b
wherein $OD_t$, $OD_b$, $OD_{ser}$ and $OD_B$ is the optical density of the test solution, blank, serine standard and buffer, respectively, $C_{ser}$ is the concentration of serine (mg/ml) in the standard (in this case 0.1 mg/ml), and $MW_{ser}$ is the molecular weight of serine (105.09). Q is the dilution factor for the enzyme solution (in this case 8) and $t_i$ is the incubation time in minutes (in this case 30 minutes).

pH activity

The pH dependence of the activity of the SP 446 protease was determined by the OPA casein method described above with the modification that the Universal Buffer was adjusted to different pH values, i.e. pH 6, 7, 8, 9, 10 and 11. The results are shown in FIG. 1 from which it appears that the SP 446 protease has a pH optimum in the range of pH 8–10.

Temperature activity

The temperature dependence of the activity of the SP 446 protease was determined by the OPA casein method described above with the modifications that the enzyme reaction was carried out at different temperatures, i.e. 15° C., 30° C., 40° C., 50° C., 60° C. and 70° C., and that the enzyme reaction was conducted in the presence and absence of 0.1% sodium tripolyphosphate (STPP) which is a common ingredient in many commercial detergents. The results are shown in FIG. 2 from which it appears that the SP 446 protease has a temperature optimum of about 50° C. whether STPP is present or not.

Glu specificity

The Glu specificity of the SP 446 protease was determined as follows:

0.5 ml of 1 mg/ml human insulin in Universal Buffer, pH 9.5 (vide supra), and 75 µl SP 446 protease (0.6 cpu/l) in the same buffer were incubated for 120 min. at 37° C. The reaction was terminated by adding 50 µl 1N hydrochloric acid.

The insulin molecule was cleaved into a number of peptide fragments. These were separated and isolated by reverse phase HPLC using a suitable C-18 column (Hibar LiChrosorb RP-18, 5 µm particles provided by Merck AG, Darmstadt, FRG). The fragments were eluted with the following solvents:

A. 0.2M sodium sulfate and 0.1M phosphoric acid; pH 2.5;

B. Acetonitrile/water, 50%;

on a linear gradient of from 90% A/10% B to 80% A/20% B for 0–5 min. and subsequently for 50 min. with 80% A/20% B. The isolated fragments were subjected to amino acid sequencing by automated Edman degradation, using an Applied Biosystems (Foster City, Calif., USA) Model 470A gas-phase sequencer, and the phenylthiohydantoin (PTH-) amino acids were analyzed by high performance liquid chromatography as described by L. Thim et al., "Secretion of human insulin by a transformed yeast cell", *FEBS Letters* 212(2), 1987, p.307. The cleavage sites in the insulin molecule were identified as shown in FIG. 3.

N-terminal amino acid sequence

The N-terminal amino acid sequence of the purified SP 446 protease was determined as described in the foregoing section. The N-terminal sequence was determined to be

```
  1      5        10      15       20
  S V I G S D D R T R V T N T T A Y P Y R(SEQ ID NO: 2)
```

Complete amino acid sequence

The complete amino acid sequence was determined from the DNA sequence. The DNA sequence was determined by standard techniques as described in the section entitled "Detailed Disclosure Of The Invention". The complete amino acid sequence is shown in the appended FIG. 4.

Based on this amino acid sequence, the molecular weight of the SP 446 protease was determined to be 23,600.

Inactivation of the SP 446 protease with DFP

Incubation of the enzyme with PMSF (1% in isopropanol) in a ratio of 1 to 10 (by volume) did not result in any inactivation of the SP 446 protease. However, incubation of 10 µl (1 mg/ml) of the enzyme with 80 µl 10 mM MOPS, pH 7.2, +10 µl 0.1M diisopropyl phosphofluoridate (DFP) for 60 min. resulted in complete inactivation of the enzyme as measured by its activity on the substrate CBZ—Phe—Leu—Glu—pNA.

EXAMPLE 2

Hydrolysis of whey protein

To 75 g of spray-dried whey protein (Lacprodan-80, available from Danmark Protein A/S, Nr. Vium, 6920 Videbœk, Denmark) dissolved in 800 ml of deionized water were added 14.7 cpu per 100 g of protein of the SP 446 protease and commercial trypsin (Pancreas Trypsin Novo 6.0 S, available from Novo Nordisk A/S, used as reference), respectively. The proteases were incubated with the whey protein for 4 hours at 65° C. and pH 8.0 by the so-called pH-stat method described in Information Sheet No. B 163f, November 1984, entitled "Use of Food Grade Alcalase® or Neutrase® for Controlled Enzymatic Hydrolysis of Proteins", available from Novo Nordisk A/S on request. The degree of hydrolysis measured for the whey protein was 12.1% obtained with SP 446 and 10.4% obtained with trypsin (the percentage is calculated from the total number of peptide bonds in the protein).

Data for the experiment for SP 446 are presented in Table 1 and on FIG. 5.

TABLE 1

| Time Min. | Viscosity mPa * s | Δ osmolality mOsm/kg | Base consumption ml 4 N NaOh |
|---|---|---|---|
| 0 | 6.72 | 0 | 0 |
| 15 | 25.92 | 92 | 7.70 |
| 30 | 59.52 | 84 | 8.35 |
| 60 | 47.04 | 90 | 8.95 |
| 90 | 32.64 | 99 | 9.35 |
| 120 | 24.96 | 100 | 9.62 |
| 180 | 18.24 | 110 | 9.95 |
| 240 | 17.28 | 103 | 10.22 |

The degree of hydrolysis may be calculated by of the following formula:

$$DH = \frac{\text{Number of peptide bonds cleaved}}{\text{Total number of peptide bonds}} \times 100$$

The total number of peptide bonds in a protein may be calculated from its amino acid composition. The number of peptide bonds cleaved may be determined from an assay of the free ó-amino groups in the hydrolysate by the following method using trinitrobenzene sulphonic acid (TNBS):

0.25 ml of a sample containing between $0.25 \times 10^{-3}$ and $2.5 \times 10^{-3}$ amino equivalents/l is mixed in a test tube with 200 ml phosphate buffer at pH 8.2. 2 ml of a 0.1% TNBS solution is added and the test tube is shaken and placed in a water bath at 50°+/−1° C. for 60 min. During incubation, the test tube and water bath are covered with aluminium foil because the blank reaction is accelerated by exposure to light. After 60 min., 4.00 ml HCl is added to terminate the reaction, and the test tube is allowed to stand at room temperature for 30 min. before reading the absorbance spectrophotometrically against water at 340 nm. For further details, see J. Adler-Nissen, *J. Agric. Food Chem.* 27, 1979, p. 1256–1262.

It was surprisingly found that hydrolysis of whey protein with SP 446 resulted in an increased viscosity of the reaction mixture. This may be ascribed to the specificity of the SP 446 protease for peptide bonds involving glutamic and aspartic acid which are hydrophilic, or may be ascribed to a plastein reaction in the hydrolysate. Despite a constantly increasing base consumption (i.e. hydrolysis is taking place) it was noticed that osmolality did not increase constantly during the hydrolysis, which will normally happen during enzymatic hydrolysis. The viscosity increased during the first 30 minutes and reached its maximum at the same point where the increase in osmolality was relatively low.

EXAMPLE 3

Hydrolysis of soy protein with the SP 446 protease 4000 ml of a suspension of soy protein concentrate, which suspension contained about 8% protein (N×6.25) was subjected to hydrolysis with a mixture of the SP 446 protease (0.1% of the 27 cpu/g enzyme) and commercial trypsin (Pancreas Trypsin Novo 3.0S available from Novo Nordisk A/S) (2%, 3.3 cpu/g) at a pH of 8.0 and a temperature of 50° C. During hydrolysis which was monitored by means of a pH-stat (Radiometer, Copenhagen, Denmark), the pH was kept constant by addition of 4N NaOH. After hydrolysis for 2 hours, a degree of hydrolysis (as defined above) of 14% was obtained, and 6N hydrochloric acid was added to a pH of 4.2 in order to inactivate the enzyme. The hydrolysis mixture was then allowed to stand for 30 min. before the supernatant was decanted through a paper filter using diatomaceous earth as filter aid. To improve the flavour, the supernatant was heated to 140° C. for 2–4 seconds and subsequently flashed into a vacuum chamber. The product was further desalinated as described by H. S. Olsen and J. Adler-Nissen, "Application of Ultra- and Hyperfiltration during production of enzymatically modified proteins", ASC Symp. Ser. 154, pp. 133–169.

A reference hydrolysate was prepared by the method described above with the exception that 1.0% of Alcalase® 2.4 L (calculated with respect to the weight of the protein corresponding to a proteolytic activity of 24 AU/kg protein) were used to hydrolyse the protein.

The thus obtained protein hydrolysates (3.5% solutions) were compared in a conventional triangle test for bitterness. The assessors judged the difference in the bitterness of the two products to be significant and preferred the hydrolysate prepared with SP 446 and trypsin.

Hydrolysis of soy protein concentrate with a mixture of SP 446 and commercial trypsin resulted in an increased viscosity of the reaction mixture. This may be ascribed to the specificity of the SP 446 protease for peptide bonds involving glutamic and aspartic acid, which are hydrophilic, or may be ascribed to a plastein reaction in the hydrolysate.

---

We claim:

1. A method of obtaining limited specific hydrolysis of proteins in a proteinaceous material at glutamic acid or aspartic acid bonds, comprising:
  (a) incubating said proteinaceous material with an enzyme preparation free of subtilisin A activity at a neutral pH, said preparation comprising a proteolytic enzyme in an amount of 0.05–15 cpu/100 g protein having the following properties:
    (i) is a serine protease specific for glutamic acid and aspartic acid residues;
    (ii) has a specific activity of at least 25 cpu (casein protease units) per gram of enzyme protein;
    (iii) has an apparent molecular weight of about 23,600;

(iv) is inhibited by diisopropyl phosphofluoridate, but not by phenylmethane sulfonylfluoride;

(v) exhibits 75% or more of its maximum activity in the pH range of 6.5–10.0;

(vi) is produced by a strain of *Bacillus licheniformis*; and (vii) has the N-terminal amino acid sequence of SEQ ID NO. 2:

Ser Val Ile Gly Ser Asp Asp Arg Thr Arg
1           5                    10
                          Val Thr Asn Thr Thr Ala Tyr Pro Tyr Arg
                                         15                  20;

(b) terminating the incubation of step (a) by inactivating said proteolytic enzyme to produce a protein hydrolysate; and (c) recovering said protein hydrolysate.

2. The method according to claim 1 wherein the proteolytic enzyme has the following amino acid sequence, s-v-i-g-s-d-d-r-t-r-v-t-n-t-t-a-y-p-y-r-a-i-v-h-i-s-s-s-
i-g-s-c-t-g-w-m-i-g-p-k-t-v-a-t-a-g-h-c-i-y-d-t-s-s-g-s-
f-a-g-t-a-t-v-s-p-g-r-n-g-t-s-y-p-y-g-s-v-k-s-t-r-y-f-i-
p-s-g-w-r-s-g-n-t-n-y-d-y-g-a-i-e-l-s-e-p-i-g-n-t-v-g-y-
f-g-y-s-y-t-t-s-s-l-v-g-t-t-v-t-i-s-g-y-p-g-d-k-t-a-g-t-
q-w-q-h-s-g-p-i-a-i-s-e-t-y-k-l-q-y-a-m-d-t-y-g-g-q-s-g-
s-p-v-f-e-q-s-s-s-r-t-n-c-s-g-p-c-s-l-a-v-h-t-n-g-v-y-g-
g-s-s-y-n-r-g-t-r-i-t-k-e-v-f-d-n-l-t-n-w-k-n-s-a-q-]

SEQ ID NO.1:

Ser Val Ile Gly Ser Asp Asp Arg Thr Arg Val Thr Asn Thr Thr Ala
1           5                    10                       15

Tyr Pro Tyr Arg Ala Ile Val His Ile Ser Ser Ser Ile Gly Ser Cys
              20                  25                    30

Thr Gly Trp Met Ile Gly Pro Lys Thr Val Ala Thr Ala Gly His Cys
         35                  40                    45

Ile Tyr Asp Thr Ser Ser Gly Ser Phe Ala Gly Thr Ala Thr Val Ser
    50                  55                    60

Pro Gly Arg Asn Gly Thr Ser Tyr Pro Tyr Gly Ser Val Lys Ser Thr
65                  70                  75                   80

Arg Tyr Phe Ile Pro Ser Gly Trp Arg Ser Gly Asn Thr Asn Tyr Asp
            85                  90                    95

Tyr Gly Ala Ile Glu Leu Ser Glu Pro Ile Gly Asn Thr Val Gly Tyr
             100                 105                 110

Phe Gly Tyr Ser Tyr Thr Thr Ser Ser Leu Val Gly Thr Thr Val Thr
            115                 120                 125

Ile Ser Gly Tyr Pro Gly Asp Lys Thr Ala Gly Thr Gln Trp Gln His
130                 135                 140

Ser Gly Pro Ile Ala Ile Ser Glu Thr Tyr Lys Leu Gln Tyr Ala Met
145                 150                 155                 160

Asp Thr Tyr Gly Gly Gln Ser Gly Ser Pro Val Phe Glu Gln Ser Ser
                165                 170                 175

Ser Arg Thr Asn Cys Ser Gly Pro Cys Ser Leu Ala Val His Thr Asn
            180                 185                 190

Gly Val Tyr Gly Gly Ser Ser Tyr Asn Arg Gly Thr Arg Ile Thr Lys
            195                 200                 205

Glu Val Phe Asp Asn Leu Thr Asn Trp Lys Asn Ser Ala Gln.
            210                 215                 220

3. The method according to claim 1 wherein the pH in step (a) is kept constant during incubation of the proteinaceous material with the enzyme preparation.

4. The method according to claim 1 wherein the proteinaceous material is selected from the group consisting of animal proteins and vegetable proteins.

5. The method according to claim 1 wherein the proteinaceous material is an animal protein selected from the group consisting of whey protein, meat protein, fish protein, and egg white.

6. The method according to claim 1 wherein the proteinaceous material is a vegetable protein selected from the group consisting of soy protein and grain protein.

7. The method according to claim 1 wherein the proteinaceous material is a vegetable protein selected from the group consisting of wheat gluten, zein, rape seed protein, alfalfa protein, pea protein, fabaceous bean protein, cotton seed protein and sesame seed protein.

8. The method according to claim 1 wherein the amount of proteolytic enzyme added to the proteinaceous material is in the range of 0.1–5 cpu/100 g of protein in said proteinaceous material.

9. The method according to claim 1 wherein the enzyme is inactivated by increasing the temperature of the incubation mixture to above about 70° C.

10. The method according to claim 1 wherein the enzyme is inactivated by decreasing the pH of the incubation mixture to below about 5.0.

11. A method of obtaining limited specific hydrolysis of proteins in a proteinaceous material at glutamic acid, lysine, arginine, or aspartic acid bonds, comprising:

(a) incubating said proteinaceous material with an enzyme preparation free of subtilisin A activity, at a neutral pH, said preparation comprising a first proteolytic enzyme in an amount of 0.05–5 cpu/100 g protein having the following properties:

(i) is a serine protease specific for glutamic acid and aspartic acid residues;

(ii) has a specific activity of at least 25 cpu (casein protease units) per gram of enzyme protein;

(iii) has an apparent molecular weight of about 23,600;

(iv) is inhibited by diisopropyl phosphofluoridate, but not by phenylmethane sulfonylfluoride;

(v) exhibits 75% or more of its maximum activity in the pH range of 6.5–10.0;

(vi) is produced by a strain of *Bacillus licheniformis*; and (vii) has the N-terminal sequence of SEQ ID NO. 2:

Ser Val Ile Gly Ser Asp Asp Arg Thr Arg Val Thr Asn Thr Thr Ala Tyr Pro Tyr Arg;
1           5                    10                       15                  20 and a second proteolytic enzyme in an amount of 0.1–10 cpu/100 g protein which is a protease which cleaves peptide bonds at Lys and Arg residues; and (b) terminating the incubation of step (a) by inactivating said first and second proteolytic enzymes to produce a protein hydrolysate; and (c) recovering said protein hydrolysate.

12. A protein hydrolysate which consists essentially of peptides with a C-terminal glutamic or aspartic acid residue and peptides with a C-terminal lysine or arginine residue obtained according to the method of claim 11.

* * * * *

UNITED STATES PATENT AND TRADEMARK OFFICE
CERTIFICATE OF CORRECTION

PATENT NO. : 5,866,357
DATED : February 2, 1999
INVENTOR(S) : Dambmann et al.

It is certified that error appears in the above-identified patent and that said Letters Patent is hereby corrected as shown below:

On the title page: item [54] and col. 1, line 1,
Title, delete "GLUYASP" and insert --GLU/ASP--

Col. 17, lines 23-29: delete
" s-v-i-g-s-d-d-r-t-r-v-t-n-t-t-a-y-p-y-r-a-i-v-h-i-s-s-s-
i-g-s-c-t-g-w-m-i-g-p-k-t-v-a-t-a-g-h-c-i-y-d-t-s-s-g-s-
f-a-g-t-a-t-v-s-p-g-r-n-g-t-s-y-p-y-g-s-v-k-s-t-r-y-f-I-
p-s-g-w-r-s-g-n-t-n-y-d-y-g-a-i-e-l-s-e-p-i-g-n-t-v-g-y-
f-g-y-s-y-t-t-s-s-l-v-g-t-t-v-t-i-s-g-y-p-g-d-k-t-a-g-t-
q-w-q-h-s-g-p-i-a-i-s-e-t-y-k-l-q-y-a-m-d-t-y-g-g-q-s-g-
s-p-v-f-e-q-s-s-s-r-t-n-c-s-g-p-c-s-l-a-v-h-t-n-g-v-y-g-
g-s-s-y-n-r-g-t-r-i-t-k-e-v-f-d-n-l-t-n-w-k-n-s-a-q-]"

Signed and Sealed this

Eleventh Day of January, 2000

Attest:

Q. TODD DICKINSON

*Attesting Officer*    *Acting Commissioner of Patents and Trademarks*

SEQUENCE LISTING ( 1 ) GENERAL INFORMATION:

( i i i ) NUMBER OF SEQUENCES: 2

( 2 ) INFORMATION FOR SEQ ID NO:1:

(i) SEQUENCE CHARACTERISTICS:
  (A) LENGTH: 222 amino acids
  (B) TYPE: amino acid
  (C) STRANDEDNESS: single
  (D) TOPOLOGY: linear (ii) MOLECULE TYPE: None (xi) SEQUENCE DESCRIPTION: SEQ ID NO:1:

| Ser | Val | Ile | Gly | Ser | Asp | Asp | Arg | Thr | Arg | Val | Thr | Asn | Thr | Thr | Ala |
|---|---|---|---|---|---|---|---|---|---|---|---|---|---|---|---|
| 1 | | | | 5 | | | | | 10 | | | | | 15 | |
| Tyr | Pro | Tyr | Arg | Ala | Ile | Val | His | Ile | Ser | Ser | Ser | Ile | Gly | Ser | Cys |
| | | | 20 | | | | | 25 | | | | | 30 | | |
| Thr | Gly | Trp | Met | Ile | Gly | Pro | Lys | Thr | Val | Ala | Thr | Ala | Gly | His | Cys |
| | | 35 | | | | | 40 | | | | | 45 | | | |
| Ile | Tyr | Asp | Thr | Ser | Ser | Gly | Ser | Phe | Ala | Gly | Thr | Ala | Thr | Val | Ser |
| | 50 | | | | | 55 | | | | | 60 | | | | |
| Pro | Gly | Arg | Asn | Gly | Thr | Ser | Tyr | Pro | Tyr | Gly | Ser | Val | Lys | Ser | Thr |
| 65 | | | | | 70 | | | | | 75 | | | | | 80 |
| Arg | Tyr | Phe | Ile | Pro | Ser | Gly | Trp | Arg | Ser | Gly | Asn | Thr | Asn | Tyr | Asp |
| | | | | 85 | | | | | 90 | | | | | 95 | |
| Tyr | Gly | Ala | Ile | Glu | Leu | Ser | Glu | Pro | Ile | Gly | Asn | Thr | Val | Gly | Tyr |
| | | | 100 | | | | | 105 | | | | | 110 | | |
| Phe | Gly | Tyr | Ser | Tyr | Thr | Thr | Ser | Ser | Leu | Val | Gly | Thr | Thr | Val | Thr |
| | | 115 | | | | | 120 | | | | | 125 | | | |
| Ile | Ser | Gly | Tyr | Pro | Gly | Asp | Lys | Thr | Ala | Gly | Thr | Gln | Trp | Gln | His |
| | 130 | | | | | 135 | | | | | 140 | | | | |
| Ser | Gly | Pro | Ile | Ala | Ile | Ser | Glu | Thr | Tyr | Lys | Leu | Gln | Tyr | Ala | Met |
| 145 | | | | | 150 | | | | | 155 | | | | | 160 |
| Asp | Thr | Tyr | Gly | Gly | Gln | Ser | Gly | Ser | Pro | Val | Phe | Glu | Gln | Ser | Ser |
| | | | | 165 | | | | | 170 | | | | | 175 | |
| Ser | Arg | Thr | Asn | Cys | Ser | Gly | Pro | Cys | Ser | Leu | Ala | Val | His | Thr | Asn |
| | | | 180 | | | | | 185 | | | | | 190 | | |
| Gly | Val | Tyr | Gly | Gly | Ser | Ser | Tyr | Asn | Arg | Gly | Thr | Arg | Ile | Thr | Lys |
| | | 195 | | | | | 200 | | | | | 205 | | | |
| Glu | Val | Phe | Asp | Asn | Leu | Thr | Asn | Trp | Lys | Asn | Ser | Ala | Gln | | |
| | 210 | | | | | 215 | | | | | 220 | | | | |

(2) INFORMATION FOR SEQ ID NO:2:

(i) SEQUENCE CHARACTERISTICS:
  (A) LENGTH: 20 amino acids
  (B) TYPE: amino acid
  (C) STRANDEDNESS: single
  (D) TOPOLOGY: linear (ii) MOLECULE TYPE: None (xi) SEQUENCE DESCRIPTION: SEQ ID NO:2:

| Ser | Val | Ile | Gly | Ser | Asp | Asp | Arg | Thr | Arg | Val | Thr | Asn | Thr | Thr | Ala |
|---|---|---|---|---|---|---|---|---|---|---|---|---|---|---|---|
| 1 | | | | 5 | | | | | 10 | | | | | 15 | |
| Tyr | Pro | Tyr | Arg | | | | | | | | | | | | |
| | | | 20 | | | | | | | | | | | | |